(12) United States Patent
Spallarossa et al.

US010048375B2

(10) Patent No.: US 10,048,375 B2
(45) Date of Patent: Aug. 14, 2018

(54) DEVICE FOR SURVEYING INTERIOR SPACES AND ARCHITECTURAL FEATURES AND METHOD OF LAYING OUT AND RECONSTRUCTING PLANS OF INTERIOR ENVIRONMENTS

(71) Applicants: Nicoló Spallarossa, Genova (IT); Luca Dellepiane, Genova (IT)

(72) Inventors: Nicoló Spallarossa, Genova (IT); Luca Dellepiane, Genova (IT)

(73) Assignee: OFFICINE IADR—OFFICINE PER L'INGEGNERIA, L'ARCHITETTURA, IL DESIGN E LA RICERCA S.R.L., Genova (IT)

( * ) Notice: Subject to any disclaimer, the term of this patent is extended or adjusted under 35 U.S.C. 154(b) by 240 days.

(21) Appl. No.: 15/024,014

(22) PCT Filed: Sep. 24, 2014

(86) PCT No.: PCT/EP2014/070405
§ 371 (c)(1),
(2) Date: Mar. 22, 2016

(87) PCT Pub. No.: WO2015/044226
PCT Pub. Date: Apr. 2, 2015

(65) Prior Publication Data
US 2016/0216375 A1      Jul. 28, 2016

(30) Foreign Application Priority Data
Sep. 27, 2013   (IT) .............................. GE2013A0095

(51) Int. Cl.
*G01C 3/08* (2006.01)
*G01S 17/08* (2006.01)
(Continued)

(52) U.S. Cl.
CPC .............. *G01S 17/08* (2013.01); *G01S 7/003* (2013.01); *G01S 7/4813* (2013.01);
(Continued)

(58) Field of Classification Search
CPC ...... G01S 17/08; G01S 17/023; G01S 7/4813; G01S 7/003
(Continued)

(56) References Cited

U.S. PATENT DOCUMENTS 4,825,394 A * 4/1989 Beamish ................ B25J 9/1697
356/147
9,207,078 B2 * 12/2015 Schorr ................ G01C 15/004
(Continued)

FOREIGN PATENT DOCUMENTS

DE      202010013825 U1     2/2011

*Primary Examiner* — Mark Hellner
(74) *Attorney, Agent, or Firm* — Themis Law

(57) ABSTRACT

A device for surveying interior spaces and architectural features, which is adapted to be placed in environments for laying out the plan of such environments. The device includes an instrument for sensing the distance of a predetermined point relative to the position of the device, such as a laser distance meter or the like, there being provided a system that senses the rotation of such device. There are also provided an electronic control unit and a power supply and generation source, such as a battery or the like, for powering such device. The present invention also relates to a method of laying out and reconstructing plans of interior environments.

20 Claims, 14 Drawing Sheets

(51) Int. Cl.
  *G01S 17/02*  (2006.01)
  *G01S 17/89*  (2006.01)
  *G01S 7/481*  (2006.01)
  *G01S 7/00*   (2006.01)

(52) U.S. Cl.
  CPC .......... *G01S 7/4817* (2013.01); *G01S 17/023* (2013.01); *G01S 17/89* (2013.01)

(58) Field of Classification Search
  USPC ...................................................... 356/4.01
  See application file for complete search history.

(56) References Cited

U.S. PATENT DOCUMENTS

| | | |
|---|---|---|
| 9,686,532 B2 * | 6/2017 | Tohme ................. G01C 15/002 |
| 2011/0216304 A1 | 9/2011 | Hall |
| 2014/0111812 A1 | 4/2014 | Baeg et al. |
| 2014/0293263 A1 * | 10/2014 | Justice ................... G01S 17/42 |
| | | 356/4.01 |

* cited by examiner

DEVICE FOR SURVEYING INTERIOR SPACES AND ARCHITECTURAL FEATURES AND METHOD OF LAYING OUT AND RECONSTRUCTING PLANS OF INTERIOR ENVIRONMENTS

The present invention relates to a device for surveying interior spaces and architectural features, which is adapted to be placed in environments for laying out the plan of such environments.

At present, the interior surveying process includes a number of steps:

a preliminary instrument selection step for selecting instruments such as a rule, a measuring tape, a distance meter, etc., a survey designing step, with the preparation of sketches, representing plans and views, a surveying step where the instrument is used for measuring and noting the lengths being considered and finally a graphical representation step, in which the required designs are digitally generated.

Surveys in interior spaces require a distance measuring instrument, and various types of such instrument are available, although a measuring tape or a modern distance meter is generally used. There are also required sheets and a pencil, as well as a writing medium and a camera for capturing details and memos.

Then, a first layout of a possible plan of the environment is made, and a tentative outline is laid out on the sheet, whereupon measurements are made of the various rooms and are transferred on the preset layout.

The measurement step is particularly problematic because rooms often do not have regular shapes and are furnished, with furniture, especially wall-mounted furniture, hindering proper reading by the laser meter.

Therefore, interior surveying is clearly difficult and prior art techniques require long working times and more than one person to perform surveys.

Reliable instruments are already known in the art, such as theodolites, dumpy levels and total stations, nevertheless these instruments are only for use in exterior surveying, especially due to their size, which affect handleability and transportability.

Furthermore, such devices have high costs, which are incompatible with interior surveying cost expectations.

Therefore, there exists in the art a yet unfulfilled need for a device for surveying interior spaces and architectural features, that might speed up the working process and simplify the surveying steps, and also afford high handleability properties and be easy to use and efficient.

The present invention fulfills the above mentioned need by providing a device as described hereinbefore, which comprises an instrument for sensing the distance of a predetermined point relative to the position of the device, such as a laser distance meter or the like.

Means are also provided for sensing the rotation of the device, there being provided an electronic control unit and a power supply and generation source, such as a battery or the like, for powering the device.

With this configuration, the dimensions of an interior space may be properly sensed using a single device.

The device is preferably laid on a horizontal surface and its position is adjusted using a dual-axis level, which may be incorporated in the device, whereupon the distance of a predetermined point is measured, the device is rotated and a new point is measured, and so on for all the points of interest in the room.

Thus, polar coordinates are obtained for each point, and are processed to obtain the Cartesian coordinates of each point of a reference frame with the origin of its axes coinciding with the position of the device.

The data is processed and a 2D plan of the room is obtained, by simply joining all sensed points.

The battery preferably consists of a rechargeable battery and, as described below through exemplary embodiments, the device may have inputs for connection of the device to the mains, for battery recharging.

As explained hereafter, such processing may be carried out by the electronic control unit or by a remote external unit, in view of simplifying the construction of the device and reducing the electronics to be programmed.

For this reason, according to a possible embodiment, a communication unit is provided in the device, for communicating the sensed data to at least one remote unit, which remote unit has processor means for executing a logic program and at least one processing unit for processing the data that has been sensed by the device.

Communication between the device and the remote unit may be established in any manner known in the art, but wireless communication technologies, such as Bluetooth or the like are preferably used.

Preferably, the device is composed of two external cases, with an upper external case locate above a lower external case.

The upper case is rotatably connected to the lower case, such that the upper case rotates about a vertical axis relative to the lower case.

This is a particularly advantageous characteristic, in that a part of the device is held stationary and the other part is rotated for sensing, thereby increasing accuracy and allowing detection of various points from a totally fixed point on the floor of the room.

According to an improvement, the upper case comprises a distance sensing instrument, the rotation sensing means and the electronic control unit, whereas the lower case comprises the power supply and generation source.

According to a preferred embodiment, electric connection circuits are provided for connecting the lower case to the upper case.

Obviously, these connection circuits may be of any known type that allows rotation of the upper external case relative to the lower external case without affecting electrical communication therebetween.

Thus, the construction of the inventive device is clearly defined, i.e. a support base in the lower portion, with the heavier parts for increasing stability and an upper case designed for sensing, which contains sensors and control electronics.

The upper case may be rotated either manually or automatically, the latter option affording more accurate displacement.

Thus, according to a possible embodiment, an electric motor is provided in the upper case, for moving the upper case relative to the lower case, and has a shaft that extends into the lower case and is rigidly joined thereto.

The motor may be controlled either through the electronic control unit and specially designed controls located on the external cases, or through the communication unit and the remote unit.

One of the objects of the present invention is to provide an easily handleable and transportable device, and hence particular care is given to the size and shape characteristics of the upper and lower cases.

In a preferred embodiment, the lower case and the upper case have the shape of a parallelepiped, with the upper case having the base surfaces congruent with the base surfaces of the lower case.

In order to improve and optimize the design and function of the device of the present invention, the two cases have bases of the same size, such that their side walls are aligned when they lay one on top of the other.

Advantageously, the base of the parallelepipeds has sides ranging from 3 to 10 cm, and the parallelepipeds have a height ranging from 0.5 to 3 cm.

Thus, the device of the present invention has the size of two measuring tapes, i.e. is highly portable.

Such reduced size also allows the device to be used not only for laying out plans of an environment, but also for surveying architectural features, such that the device of the present invention may be also used to create templates.

Due to its reduced size the device may be placed everywhere, even in very small spaces, e.g. for surveying wall profiles in view of creating custom furniture.

No prior art device allows easy creation of templates, and the only available way to create a template is to use a sheet or a plywood panel and cut it to size.

In view of the importance and advantages of a reduced size, the arrangement of the various parts in the device is critical, because the device shall allow stable rotation of the upper case, i.e. without changing the position of the lower case, while affording proper sensing of the points of interest by the sensors of the device.

Therefore, a compromise shall be made between the size and weight required to impart stability to the device.

The above described configuration of the two rotatably connected cases with the battery located below, poses an electric connection problem, in that the upper part shall be able to rotate through 360° without affecting the connections of the various parts of the upper case to the power source.

This problem has been solved by providing a particular arrangement of the connection circuits, which are composed of at least one upper annular track, rigidly joined to the upper case, and connected to a corresponding lower annular track, rigidly joined to the lower case, through at least one connecting connecting ball interposed between the two tracks, for the upper case to be able to rotate relative to the lower case due to rotation of the connecting ball.

Obviously, the tracks and the ball are made of metal, to provide electric contact between the battery and the upper parts.

The upper annular track is electrically connected to the lower annular track.

Furthermore, both annular tracks are coaxial with the vertical center axis of the device.

All the above described advantages will be better understood from the description of the accompanying drawings.

In a further embodiment, the means for sensing the rotation of the device consist of an accelerometer incorporated in the motor.

This arrangement further contributes to reducing the size of the device.

Advantageously, the electric motor may be a servomotor that allows sensing of the rotation of one case relative to the other, particularly the upper case relative to the lower case.

The use of a servomotor is particularly advantageous for the purposes of the device of the present invention, due to possible requirements of low inertia, highly linear voltage/speed and current/torque relationships, uniform rotation with low cogging torque and no preferential positions and the ability to withstand power peaks that generate wide and sudden changes in the rotation of the device.

Furthermore, according to a preferred variant embodiment, the remote unit comprises at least one control unit for controlling the operation of the device.

It shall be noted that while the device is mainly designed for laying out and creating 2D interior plans, the above described characteristics will allow the device to be improved for height sensing of points, by simply introducing a rotation about an axis parallel to the ground, to make 3D plans.

For example, the device may be supported by a trestle and a 90° rotation of the device will provide the outline of an ideal section of the environment to be surveyed.

This variant will also allow determination of the volumes of the environments, by joining the plans and the surveyed sections.

According to a further embodiment, a photographic acquisition device may be provided, for capturing images of the surrounding environment.

Advantageously, the photographic acquisition device may be provided with a control unit for controlling the operation thereof.

Indeed, the photographic acquisition device may be programmed by the control unit to perform regular acquisitions in accordance with predetermined rules, e.g. based on rotation or time.

Instead of or in addition to the above, the control unit may be designed to actuate the photographic acquisition device each time that an anomaly, such as a window, a door or a projection, i.e. a discontinuity in the walls to be surveyed, is detected.

The above description clearly shows that the device of the present invention provides the additional advantage of allowing use thereof as a conventional distance meter.

In this case, a screen will be preferably provided on one of the two cases, for displaying the sensed distance.

Furthermore, since the device of the present invention also provides advantages in the creation of interior plans, the present invention also relates to a method of laying out and reconstructing interior plans using a surveying device located inside an environment.

The device is preferably constructed according to one or more of the above described characteristics.

The method of the present invention includes the steps of:
a) placing the device in a first predetermined zone in the environment,
b) sensing the distance of a predetermined point relative to the position of the device,
c) rotating the device and sensing the distance of at least one second predetermined point and measuring the rotation,
d) repeating the steps b) and c),
e) processing the sensed data and reconstructing the plan of the environment.

As mentioned above, the device allows each point to be assigned its polar coordinates, which are later easily converted into Cartesian coordinates, using conventionally known algorithms.

If the layout concerns not only a room but a whole map, especially in case of complex geometries, the method of the present invention includes the additional steps of:
f) placing the device in a further zone,
g) sensing the distance of a predetermined point relative to the position of the device,
h) rotating the device and sensing the distance of at least one second predetermined point and measuring the rotation, i) repeating the steps g) and h), with two points sensed during steps g) and h) coinciding with two corresponding points sensed during steps b) and c), l) processing the sensed data and reconstructing the plan of the environment.

As clearly shown by a few illustrated embodiments, the above described characteristic allows separate surveying of two adjoining environments, which are later joined by causing the Cartesian coordinates of common points to coincide.

Preferably, the sensed data are processed by a remote unit, the sensed data being transmitted to the remote unit through the communication unit of the device.

Furthermore, the movement and operation, i.e. the actuation of sensors, may be also controlled remotely through a control unit located in the remote unit.

As explained below, the control unit may consist of a portable device such as a smartphone, a tablet or the like, to improve the use of the device of the present invention.

Also, in a possible variant of the method of the present invention, the surveying steps are carried out automatically.

This means that the control unit may be programmed to send controls to the device to program the movements thereof and the frequency of the sensing operations.

Advantageously, the method of the present invention may include a step m) of acquiring at least one image of the surrounding environment.

In combination with the latter characteristic, the step m) may be designed to be carried out automatically, according to previously established rules concerning the photographic acquisition device.

The above described characteristics show that the device and method of the present invention can be used in many different applications by different users, such as architects, carpenters, floor and parquet layers, by simple implementation of the features of the logic program in the remote unit for controlling the device of the present invention.

For example, using prior art teachings, once the plan of a given environment has been obtained, a feature may be implemented to calculate square meters, or designing tile scrubbing, which is particularly useful for a floor layer.

Likewise, features may be implemented for using the device of the present invention for applications not strictly related to architecture and structural surveys, such as in accident surveys by traffic officers, or for the use of the device by firefighters, archaeologists, etc.

These and other features and advantages of the present invention will appear more clearly from the following description of a few embodiments, illustrated in the annexed drawings, in which.

Figure 1A:
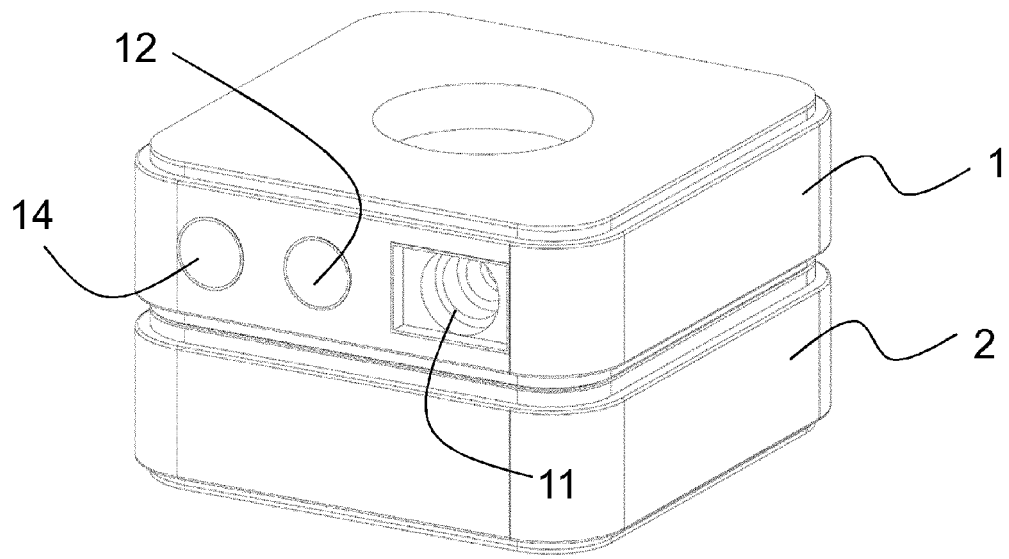
FIGS. 1a and 1b show two perspective views of the device of the present invention.

It shall be noted that the figures annexed to the present application relate to particular variant embodiments of the device of the present invention and shall be intended to illustrate without limitation the general principle of the present invention, i.e. the provision of a device for surveying interior spaces and architectural features that is easy to use and highly portable and affords reliable surveying with time and cost savings.

The device for surveying interior spaces and architectural features of the present invention is adapted to be placed in environments for laying out the plan of such environments.

Namely, the device comprises an instrument for sensing the distance of a predetermined point relative to the position of the device.

Here, this instrument is a distance meter, consisting of a laser diode 11 and a receiving sensor 12.

Means are also provided for sensing the rotation of the device, there being provided an electronic control unit 13 and a power supply and generation source, such as a battery 21 or the like, for powering the device.

The means for sensing the rotation of the device may consist of an accelerometer or a digital goniometer incorporated in such device.

Preferably, as explained below, a communication unit is provided, for communicating the sensed data to at least one remote unit, which remote unit has processor means for executing a logic program and at least one processing unit for processing the data that has been sensed by the device.

Preferably, this communication unit may be incorporated in the electronic control unit 13, which consists of a common printed circuit board 13.

Figure 1B:
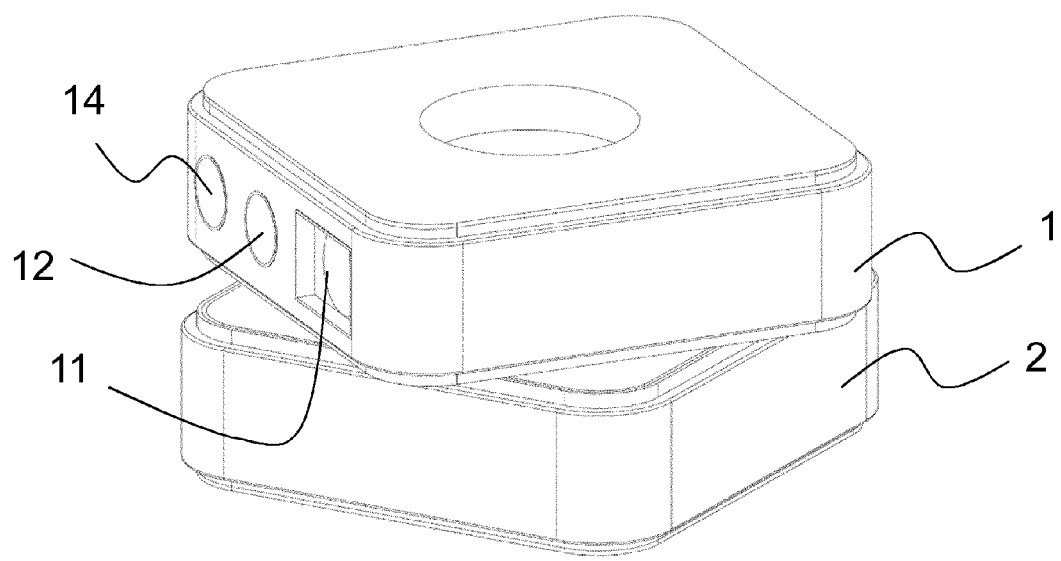

According to the variant as shown in the figures, particularly in FIGS. 1a and 1b, the device of the present invention is composed of two external cases 1 and 2, i.e. an upper external case 1 located above a lower external case 2, which upper case 1 is rotatably connected to the lower case 2, such that the upper case 1 rotates about a vertical axis relative to the lower case 2.

In accordance with a possible embodiment, a lock system may be provided for locking the rotation of the two cases when the device is not used.

This lock system may consist, for example, of a pin rigidly joined to one of the two cases and adapted to be pulled out and held in one of the two cases, such that, as it is pulled out it engages a corresponding seat of the other case thereby preventing rotation thereof.

Figure 2:
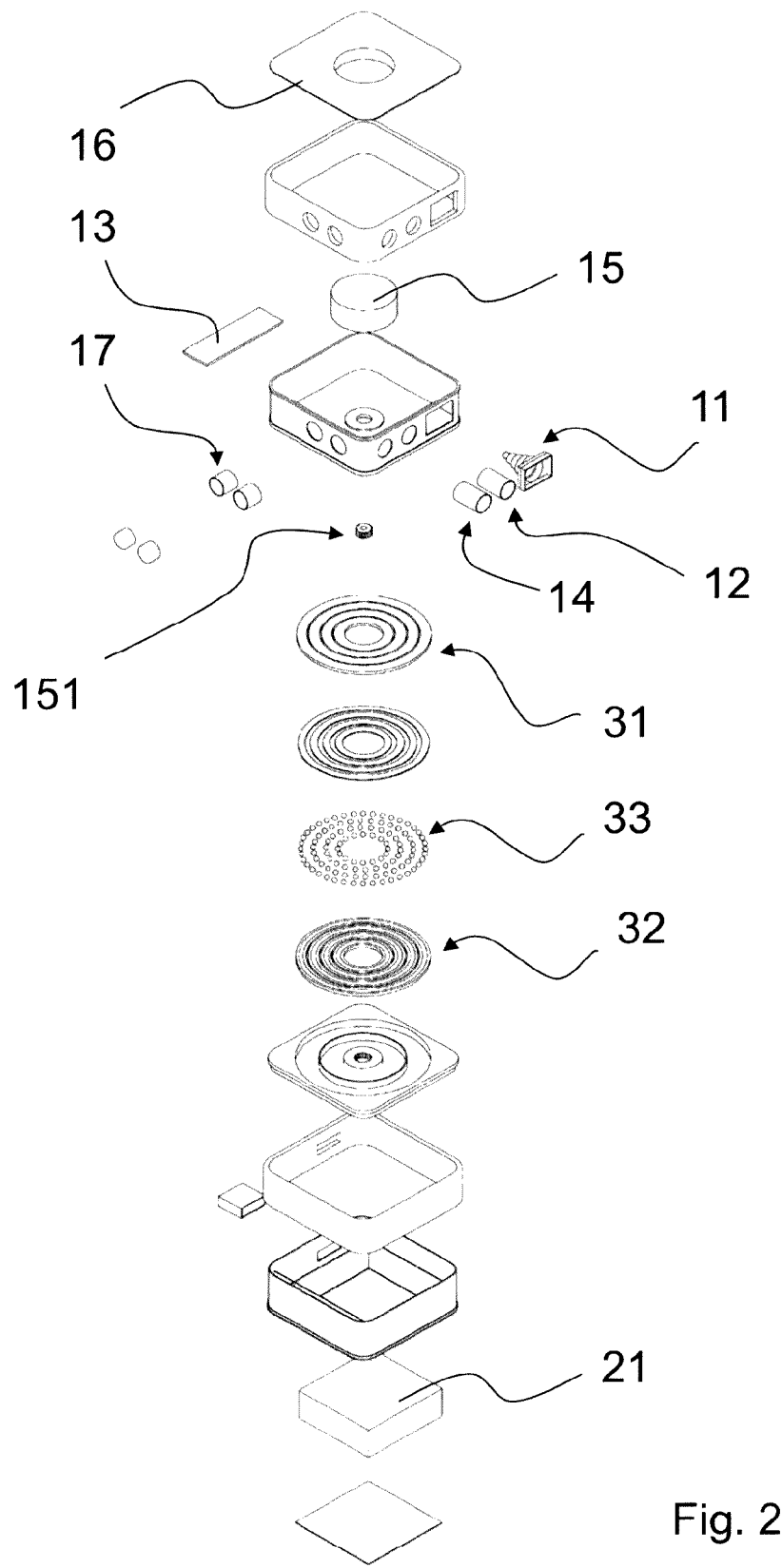
FIG. 2 shows an exploded view of the device of the present invention.

As shown in FIGS. 1a to 2, the upper case 1 comprises the distance sensing instrument 11 and 12, the rotation sensing means and the electronic control unit 13.

In the variant of the figures, the upper case 1 also comprises a photographic acquisition device, such as a camera 14, for integrating the sensed data with a few images or videos of the environment being surveyed.

The lower case 2 comprises the power supply and generation source 21.

Electric connection circuits are also provided for connecting the lower case 1 to the upper case 2.

An electric motor 15 is further provided, for moving the upper case 1 relative to the lower case 2.

The electric motor 15 is located in the upper case 1, and is rigidly joined thereto, and has a shaft 151 that extends into the lower case 2 and is rigidly joined thereto.

Advantageously, the lower case 2 and the upper case 1 have the shape of a parallelepiped, with the upper case 1 having the base surfaces congruent with the base surfaces of the lower case 2.

Namely, the base of the parallelepipeds has sides ranging from 3 to 10 cm, and the parallelepipeds have a height ranging from 0.5 to 3 cm.

Figure 3A:
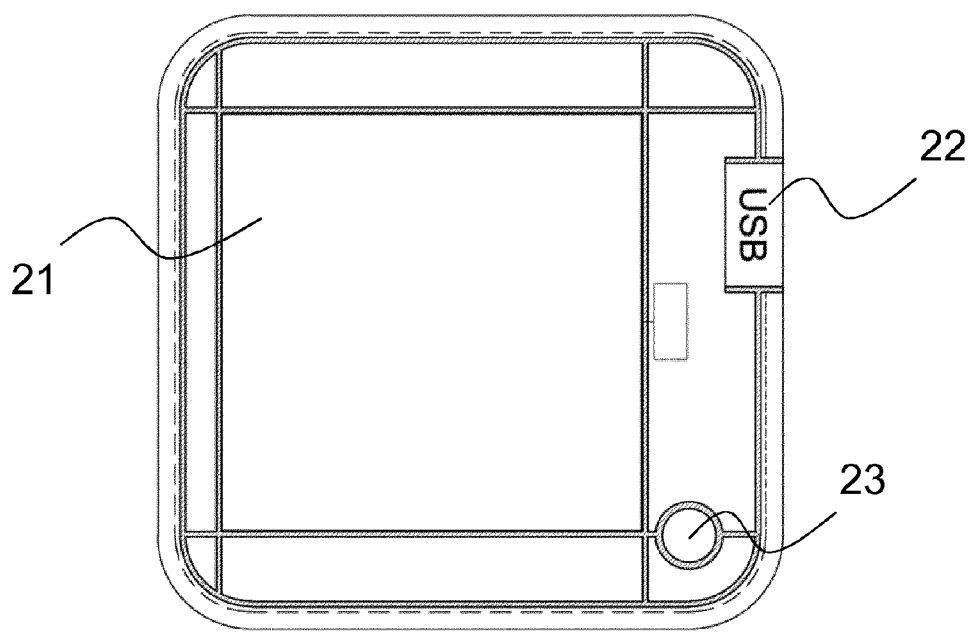
FIGS. 3a to 3d show different views of the device of the present invention.
Figure 3B:
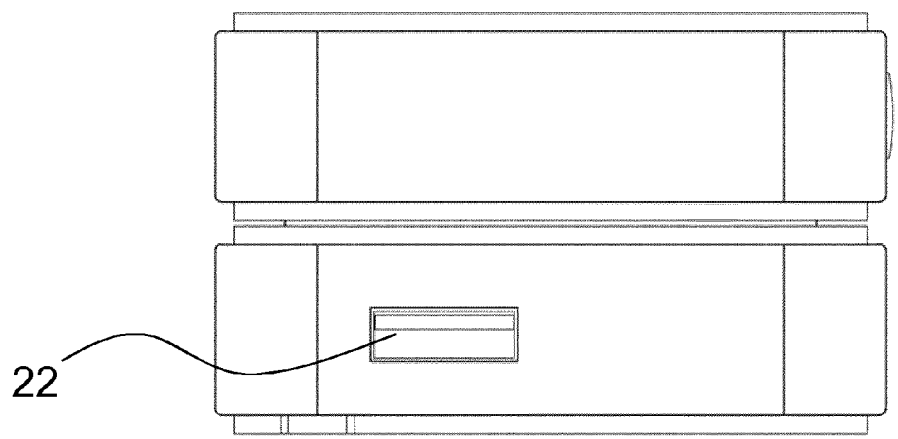

FIG. 3a it a bottom view of the bottom of the lower case 2 to clearly show the battery 21 housed therein.

Preferably, the battery 21 is of the rechargeable type, and all the connection circuits required for recharging are located in the lower case 2.

Particularly, a USB input 22 or the like may be provided, through which the battery may be recharged and the electronic control unit 13 may be programmed through connection of the device to a remote unit.

The USB input 22 also allows communication between the device and a remote unit, to provide an alternative to the wireless communication as described above.

Particularly referring to FIGS. 3a to 3d, a trestle screw 23 is shown, for fixation of the device, which is very useful for environments where no support surfaces or no leveled surface is provided.

Figure 3C:
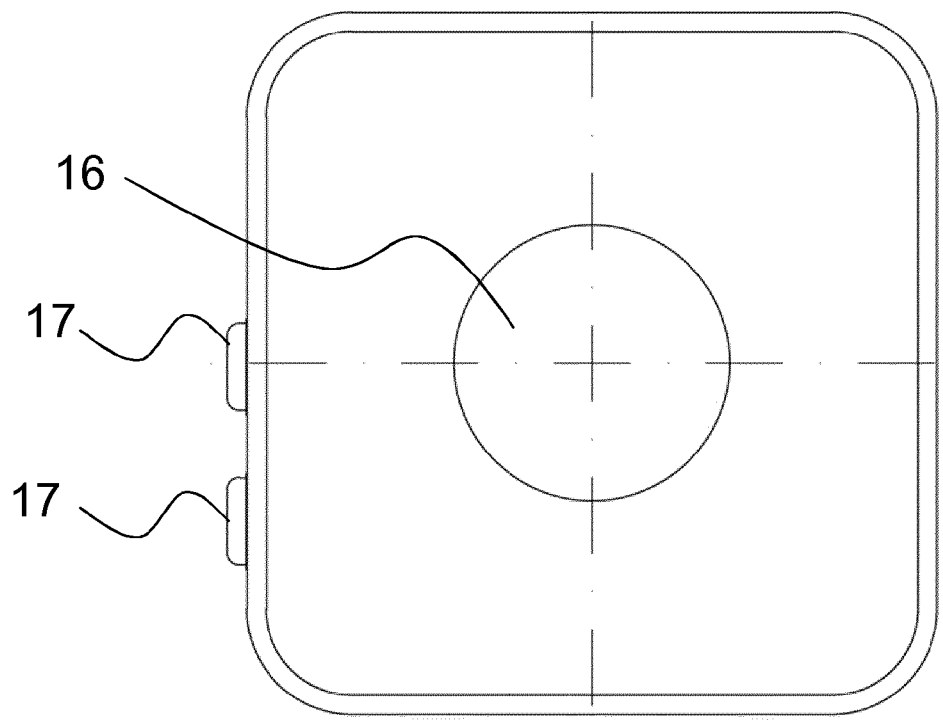

Furthermore, FIG. 3c shows a spherical bubble level 16 disposed above the motor 15, at the top of the upper case 1 to control proper positioning of the device.

According to a possible embodiment, a magnetic membrane keypad is inserted in the spherical bubble level 16 with a LED that provides a feedback about the on/off state of the device.

Figure 3D:
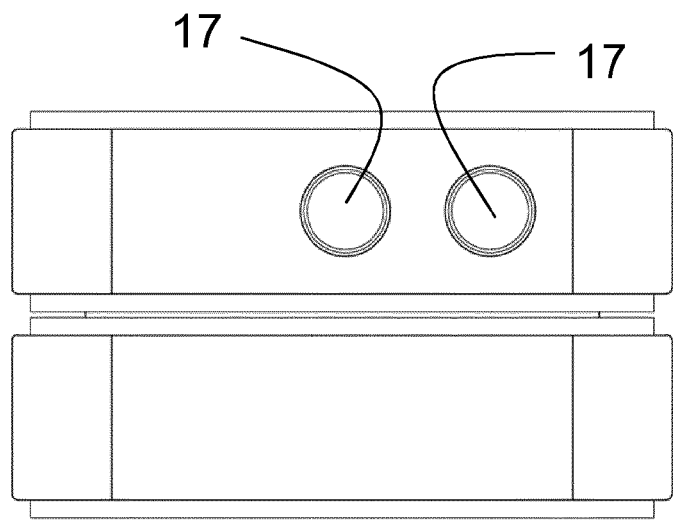
Figure 4A:
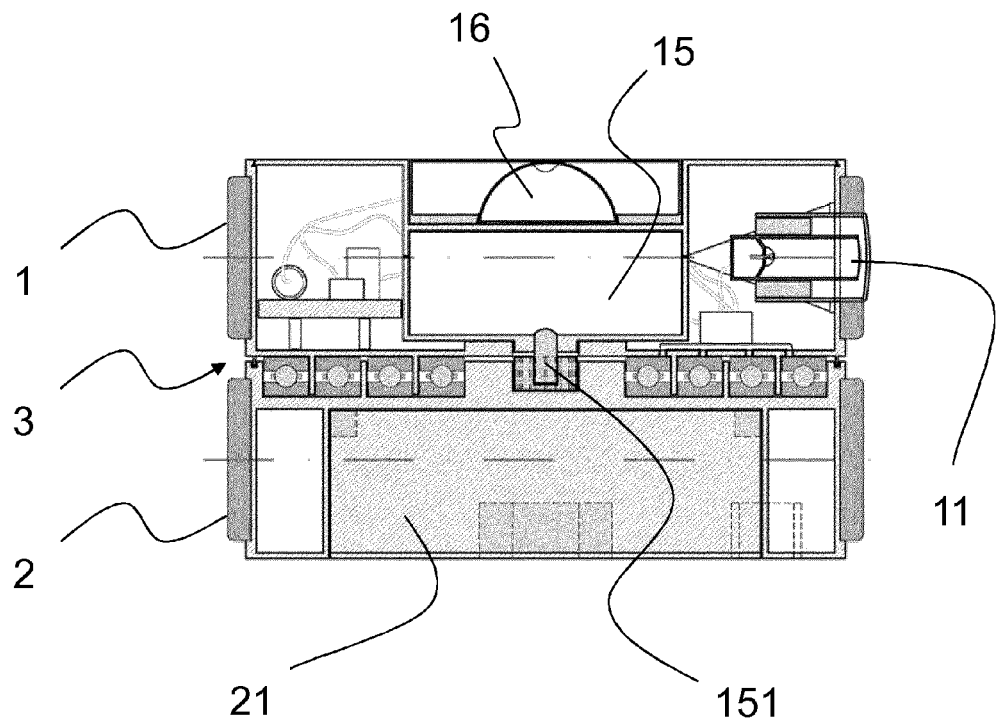
FIGS. 4a to 4d show different sectional views of the upper case or the lower case of the device of the present invention.
Figure 4B:
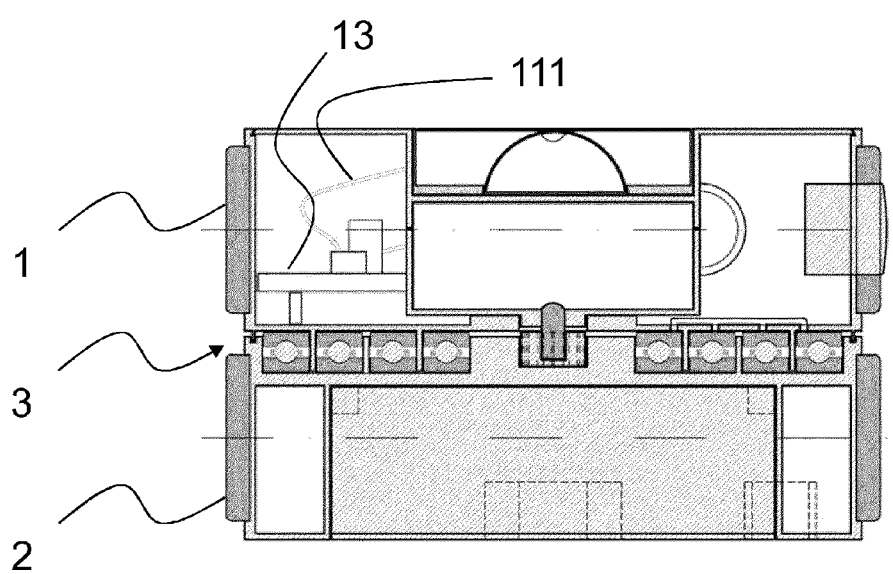
Figure 4C:
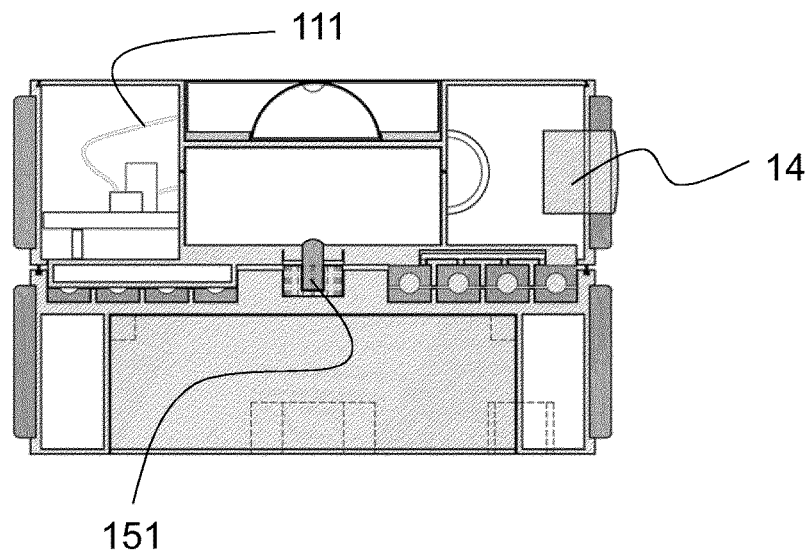
Figure 4D:
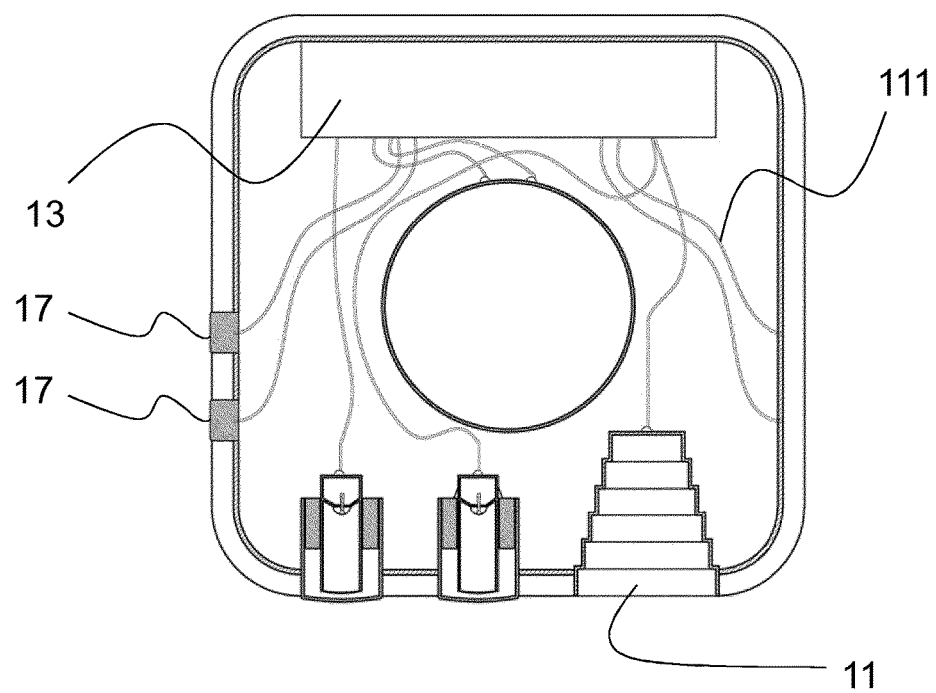

FIG. 3d shows two pushbuttons 17 located at one side of the instrument, one for turning it on and off and the other for using the device as a normal distance meter.

According to a possible embodiment, one of the two pushbuttons, preferably the ON pushbutton, has the feature of locking the rotation of the upper case relative to the lower case.

If the locking system is as described above, the pushbutton 17 may be designed for enabling the pin.

Otherwise, this arrangement may be obtained by a mechanical lock, i.e. the pushbutton 17 is pressed once to turn the device on/off and is held pressed to actuate an engagement pawl which either locks the shaft of the motor 151 or engages with the lower case 2.

Furthermore, this improvement is particularly useful when the device of the present invention is used as a simple distance meter.

This aspect, in combination with the parallelepipedal shape of the upper case 1 and the lower case 2 facilitates the use of the device as a distance meter, by allowing easy and optimized contact of the device with the vertical walls of the house.

A similar variant may be obtained by pressure on the spherical bubble level 16.

FIGS. 4a to 4d show different sectional views of the device of the present invention according to a possible embodiment.

The upper part 1 is rotatably connected to the lower part 2 by means of the electric motor 15 integrated in the upper part 1, but having its shaft 151 rigidly joined to the lower case 2.

The battery 12 is placed in the lower case 1 and the connection circuits 3, as described below, allow connection thereof to the various parts located in the upper part 1.

Each part, particularly the laser diode 11, the receiving sensor 12, the pushbuttons 17 and the camera 14 are connected to the printed circuit board 13 by means of connecting cables 111 held within the upper case 1.

Figure 5A:
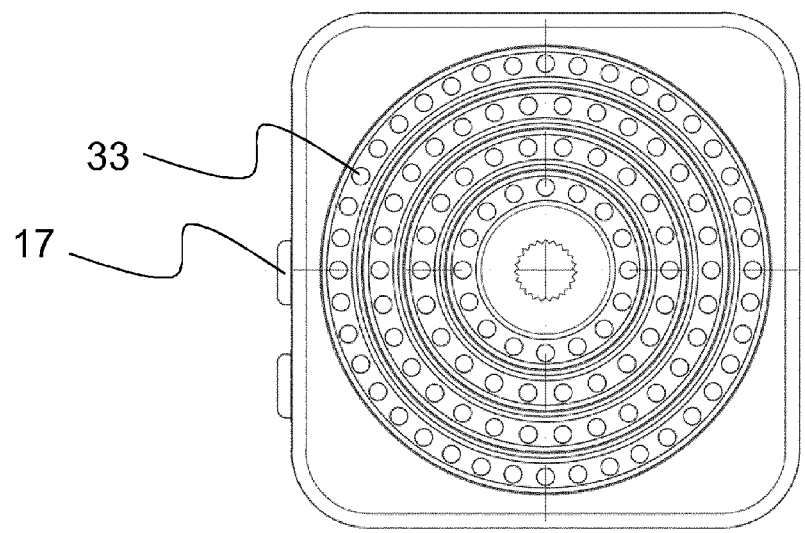
FIGS. 5a and 5b show two variant embodiments of the electric contacts of the device of the present invention.
Figure 5B:
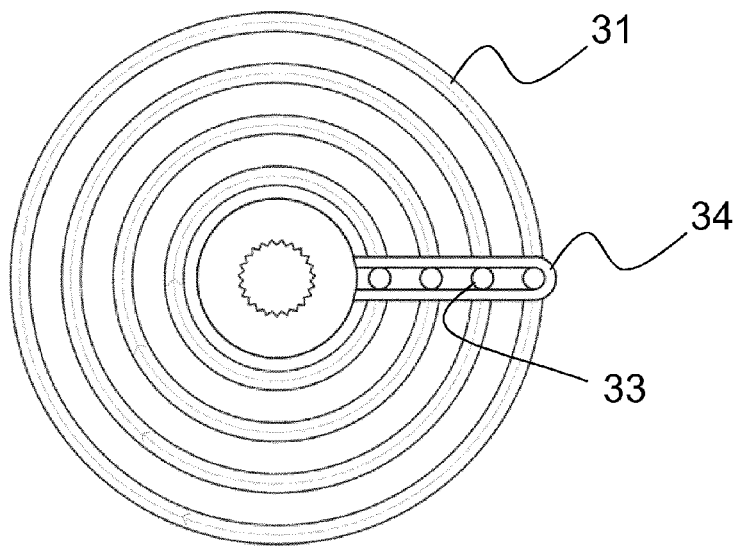

FIGS. 5a and 5b show two possible variant embodiments of the connection circuits 3.

Generally, the connection circuits, referring to FIG. 2, are composed of at least one upper annular track 31, rigidly joined to the upper case 1, and connected to a corresponding lower annular track 32, rigidly joined to the lower case 2, through at least one connecting ball 33 interposed between said two tracks 31 and 32, for the upper case 1 to be able to rotate relative to the lower case 2 due to rotation of the connecting ball 33.

Both annular tracks 31 and 32 are preferably coaxial with the vertical center axis of the device.

The connection circuits actually consist of bearings, having a portion rigidly joined to the upper case 1 which moves relative to another portion rigidly joined to the lower case 2 due to the rotation of a ball 33 which maintains the electric contact between the two tracks 31 and 32 in spite of the rotation of the upper case 1 relative to the lower case 2.

Preferably, the device of the present invention has a track for each signal to be transmitted, and in this particular case a track for each part of the upper case that is to be powered by the battery 21.

FIGS. 5a and 5b show two sectional views of different embodiments of the connection circuits 3, as taken along a horizontal plane.

FIG. 5a shows that as many connecting balls 33 may be provided as to cover the entire surface of the annular tracks 32 or 33.

In addition to allowing rotation and maintaining electric connection between the tracks, the connecting balls 33 contribute to facilitate movement of the tracks, i.e. to make rotation smoother.

Otherwise, as shown in FIG. 5b, a single connecting ball 33 may be provided, which is locked in position by a locking member 34: such locking member 34 holds the ball 33 in position, allowing it to rotate about itself and ensuring rotation of the upper part 1 relative to the lower part 2.

As described above, the tasks of the device of the present invention may be directly controlled by the device or carried out through a remote unit such as a smartphone, a tablet or the like, which contains a control unit adapted to control the tasks of the device and which communicates therewith through the communication unit.

It shall be noted that the communication unit of the device may be of any conventionally known type and is preferably a wireless connection unit, such as a bluetooth connection unit or the like.

According to a possible embodiment, the device of the present invention is controlled and monitored by a remote unit through a particular control unit which communicates with the communication unit of the device.

As already mentioned above, the remote unit may be any device whatever, but is preferably a smartphone, a tablet or the like, having processor means for executing a logic program, particularly a program for managing a device of the present invention.

FIGS. 6a to 6l show views of the program for managing the device of the present invention.

Figure 6A:
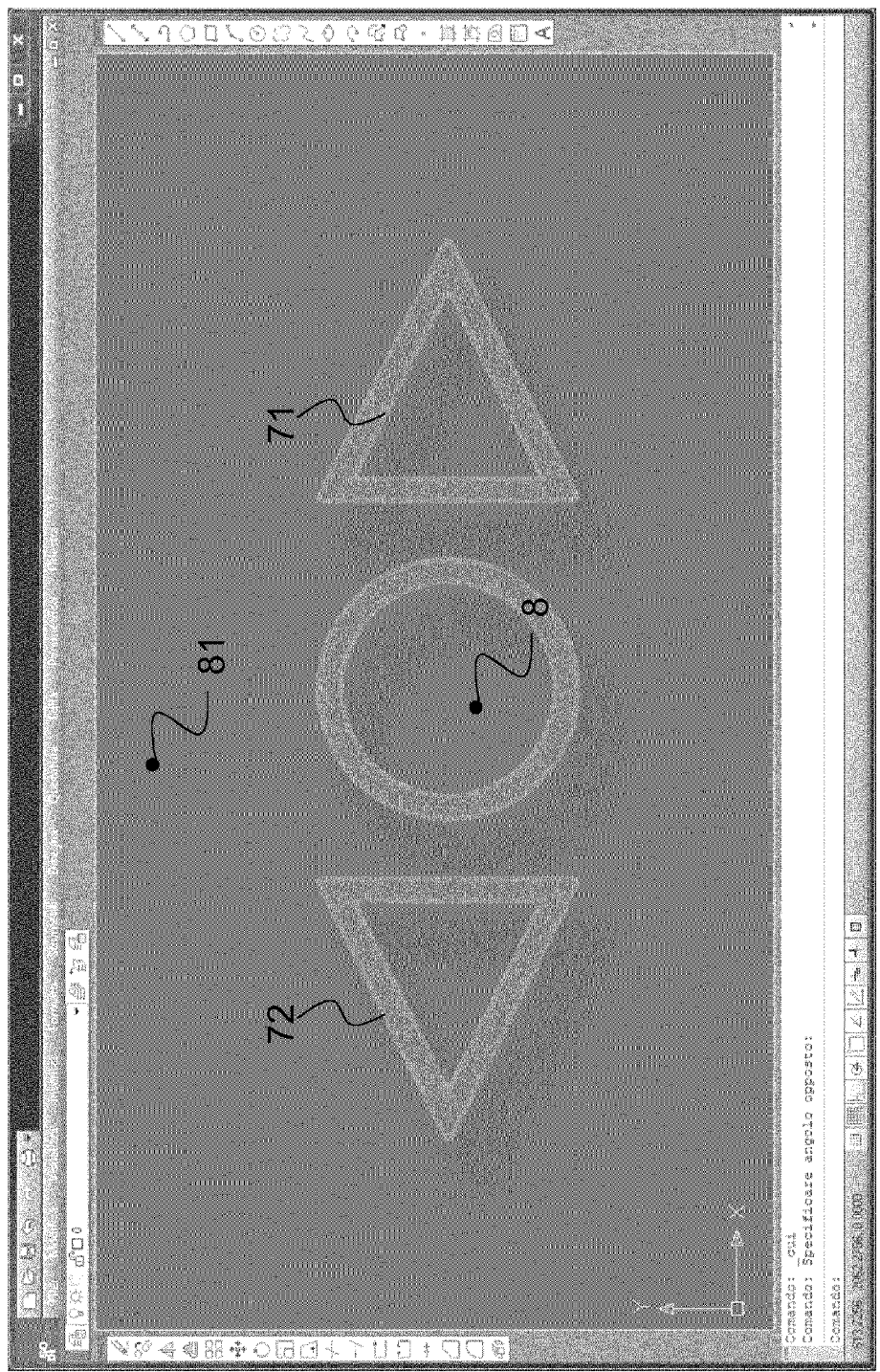
FIGS. 6a to 6g show different views of the control unit of the device of the present invention.

As shown in FIG. 6a, the program includes all typical CAD instruments, and has a main window with two arrows 71 and 72, which allow the device of the present invention to be rotated in the direction of the arrow.

Obviously, if a tablet or a smartphone is used, touch controls will be provided, i.e. the screen of FIG. 6a will be displayed on the touch screen of the remote unit.

Also, FIGS. 6a to 6g clearly show the method of laying out and reconstructing interior plans according to the present invention, which involves the use of a device having one or more of the characteristics as described above.

Figure 6B:
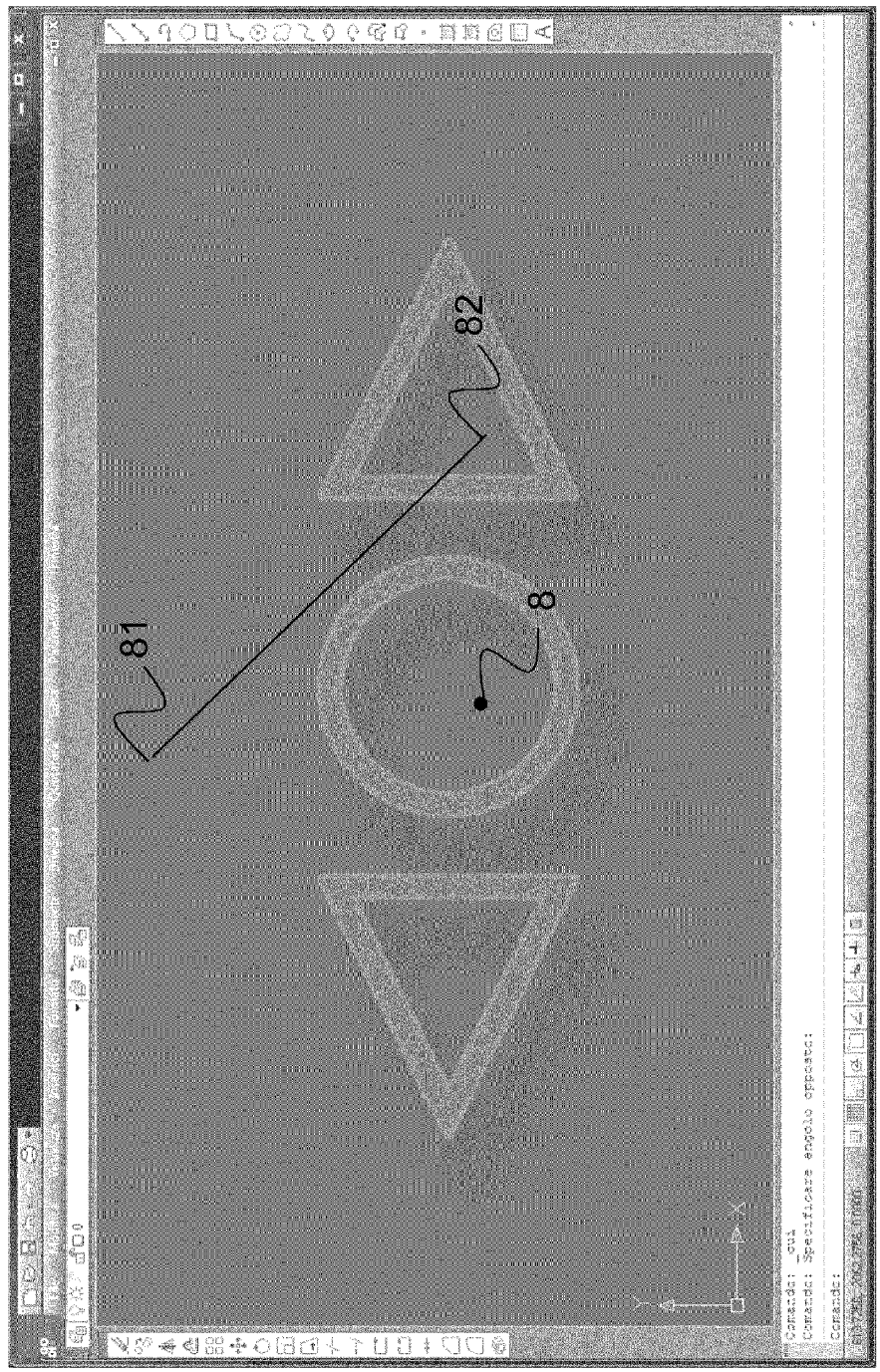

The method includes the following steps:

a) the device is placed in the environment, in a first predetermined zone, referenced 8 in FIG. 6a, b) the device uses the distance meter to sense the distance of a predetermined point, referenced 81 in FIG. 6a, relative to 8, c) the device is rotated clockwise using the right arrow 71 on the control unit, the distance of a second predetermined point, referenced 82 in FIG. 6b, is sensed, and the rotation performed by the device is measured.

Now, the points 81 and 82 are uniquely identified through a system of polar coordinates and through known trigonometric formulas, Cartesian coordinates are assigned to each point, in a reference frame in which the origin of the axes is the point 8 at which the device is positioned.

The processing unit, which may be integrated in the device and/or the remote unit, processes the sensed data and plots the first line, the segment that joins the points 81 and 82, i.e. the first wall of the room to be surveyed, as shown in FIG. 6b.

Figure 6C:
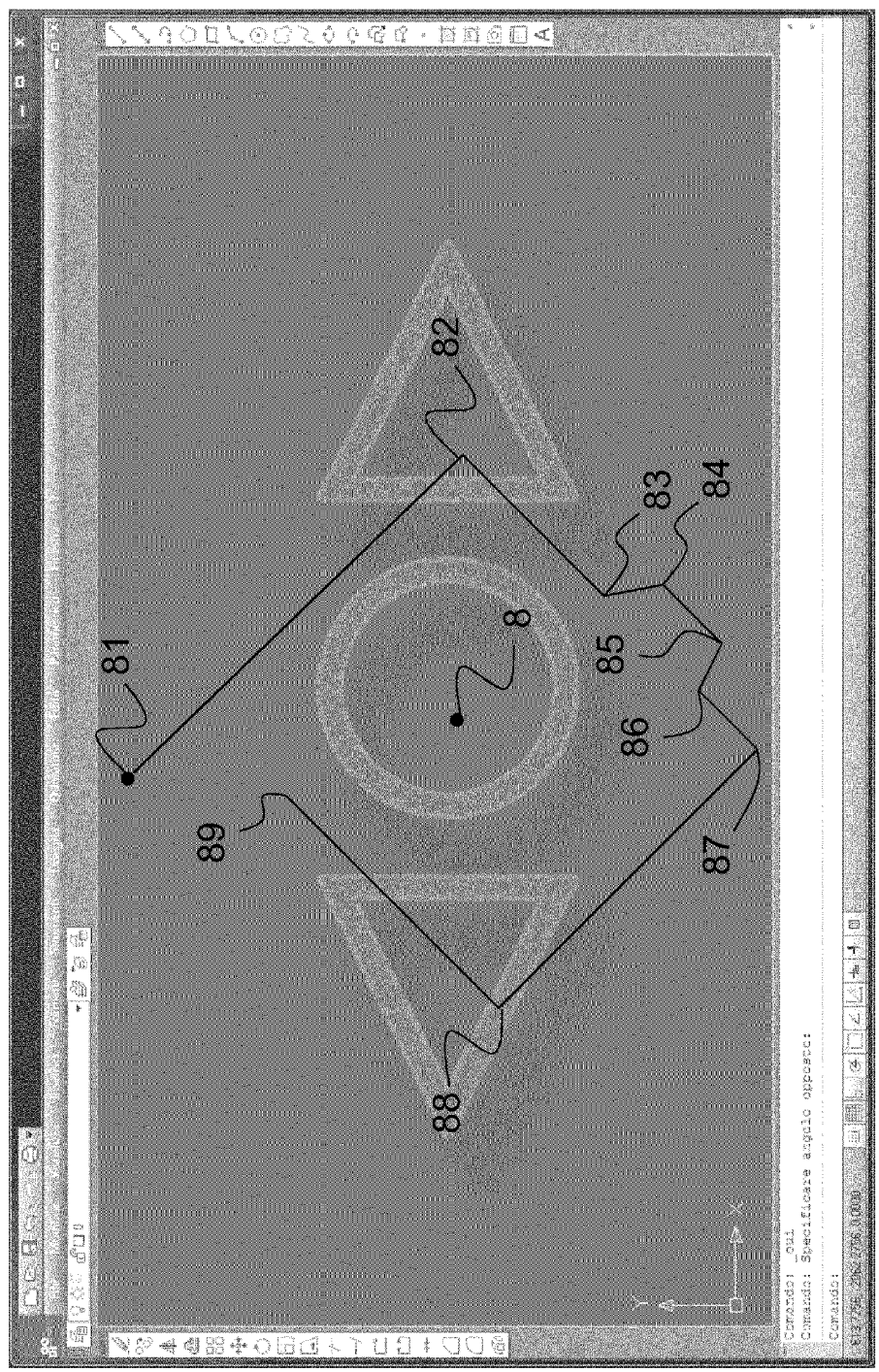

The steps b) and c) are repeated to cover the whole plan of the room, which is shown in FIG. 6c, as composed of the points 81 to 89.

As mentioned above, and particularly referring to FIG. 6c, since the program includes all the known features of a CAD program, the device is not required to identify points precisely located at the corners of the plan to be created, but to simply locate the walls.

For example, in order to recreate the segments identified by the points 81, 82 and 83, any two points in the segment defined by 81 and 82 and any two points in the segment defined by 82 and 83 will be simply identified, to recreate the angle with conventionally known CAD instruments.

Figure 6D:
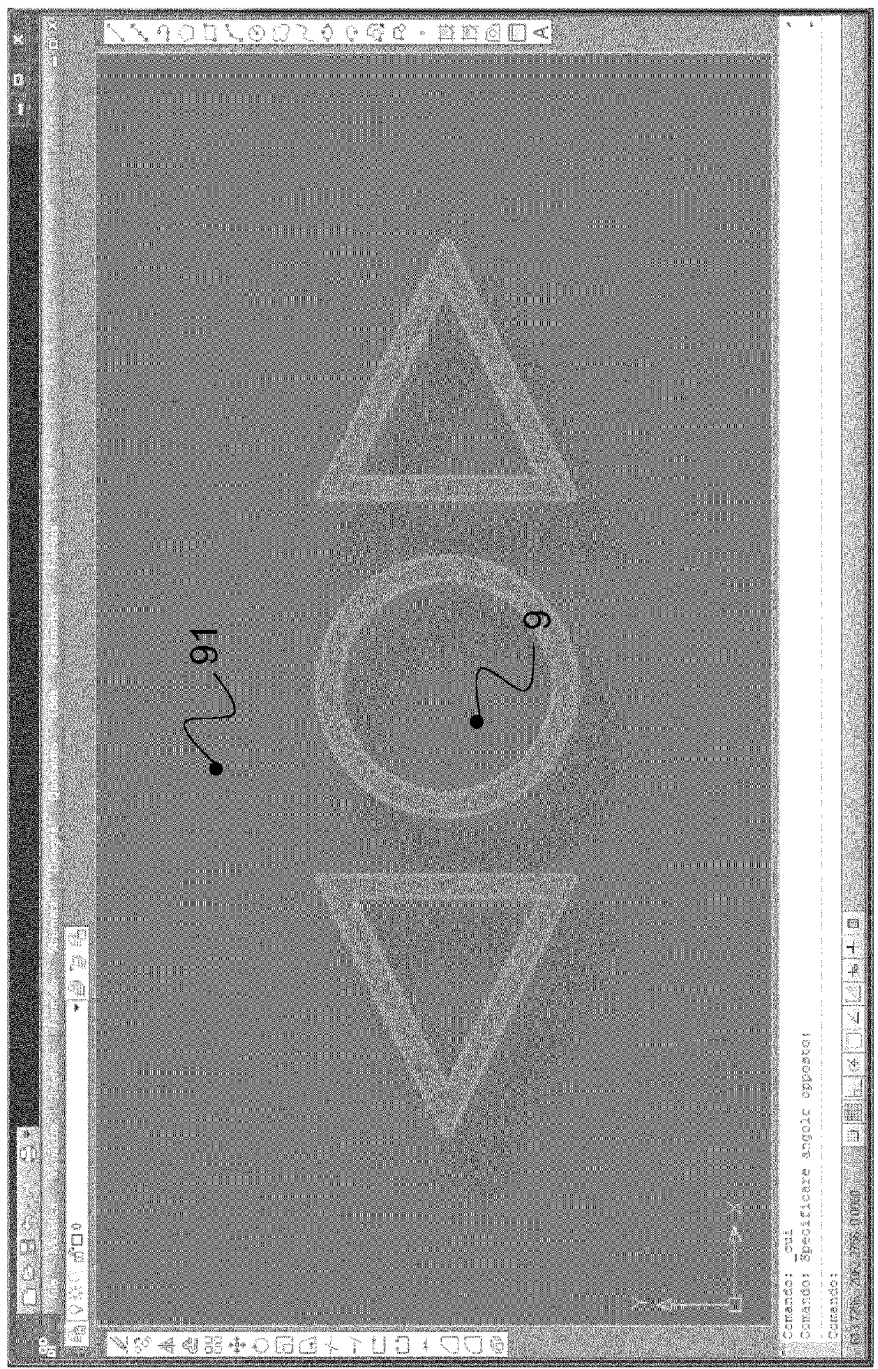
Figure 6E:
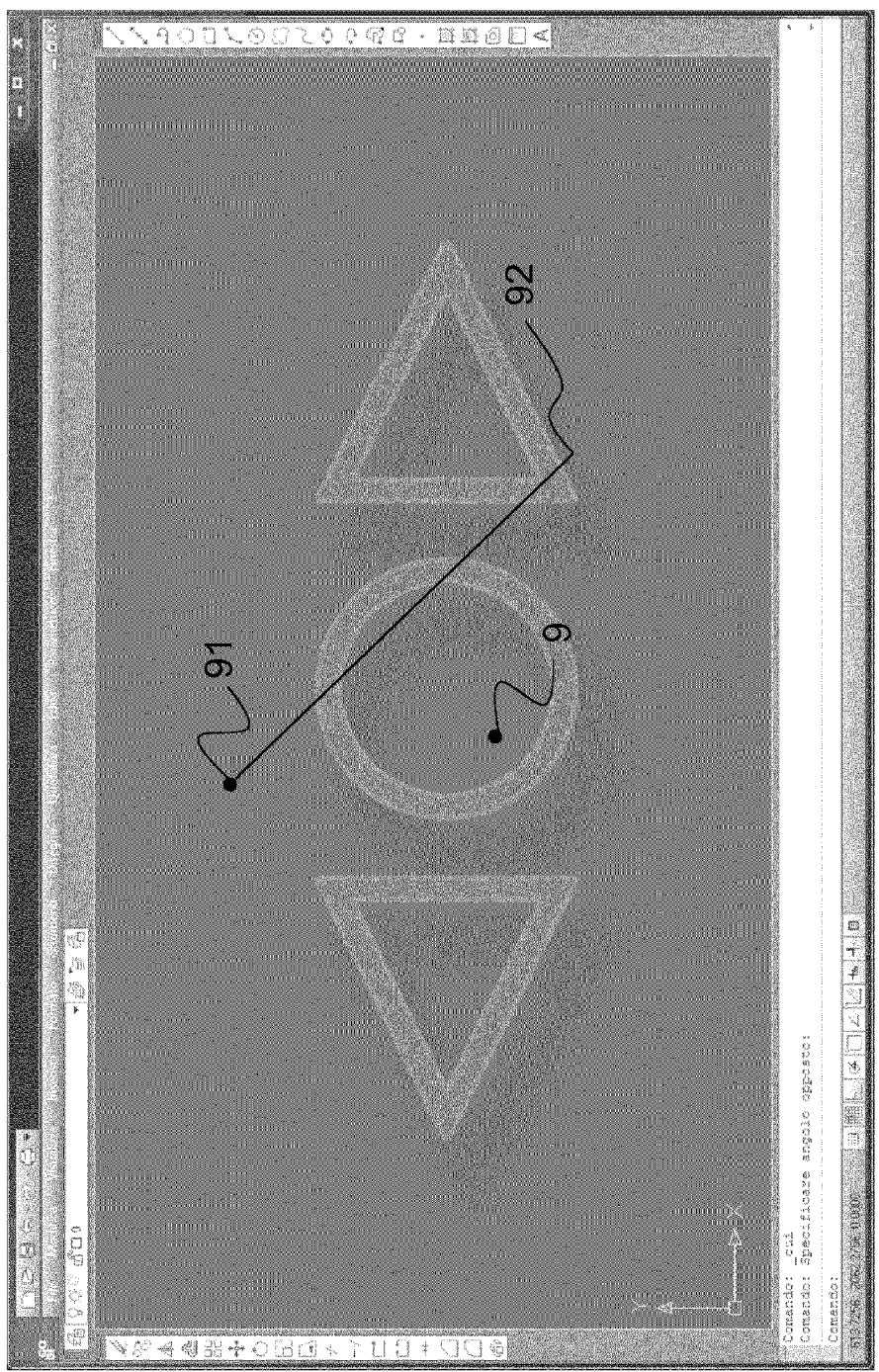

Assuming that a full plan of an apartment composed of two rooms is desired, with the first room is the one obtained in FIG. 6c, the method of the present invention includes the following additional steps:

f) the device is placed in the environment, in a second predetermined zone, referenced 9 in FIG. 6d, g) the device uses the distance meter to sense the distance of a predetermined point, referenced 91 in FIG. 6d, relative to 9, h) the device is rotated clockwise using the right arrow 71 on the control unit, the distance of a second predetermined point, referenced 92 in FIG. 6e, is sensed, and the rotation performed by the device is measured.

Figure 6F:
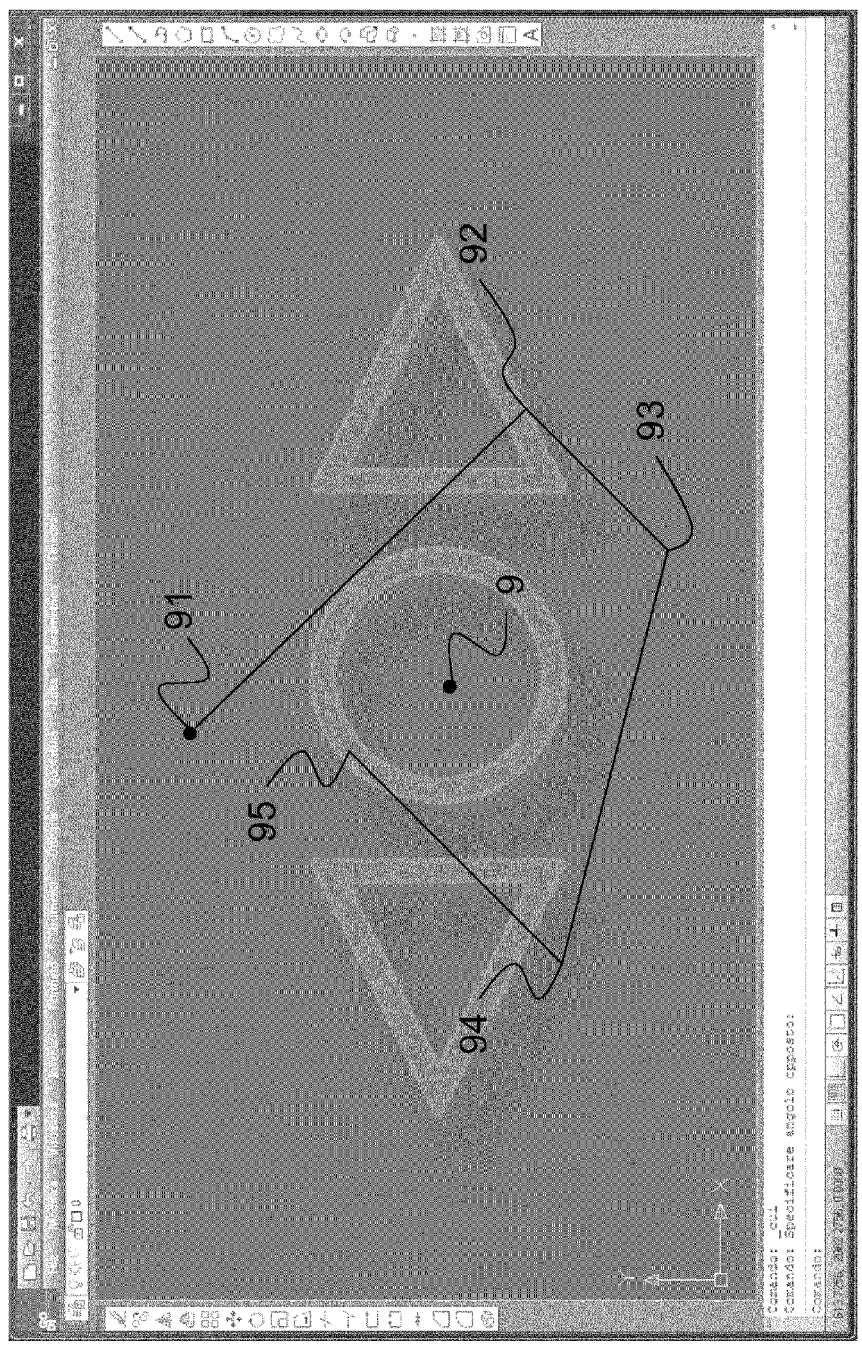

Like the previous steps described for the first room, these steps provide the plan of the second room as shown in FIG. 6f.

The second survey, i.e. with the device placed at point 9, shall have two points in common with the previous survey, here the points 91 and 5, which are in common with the points 81 and 89 of the plan of FIG. 6c.

Figure 6G:
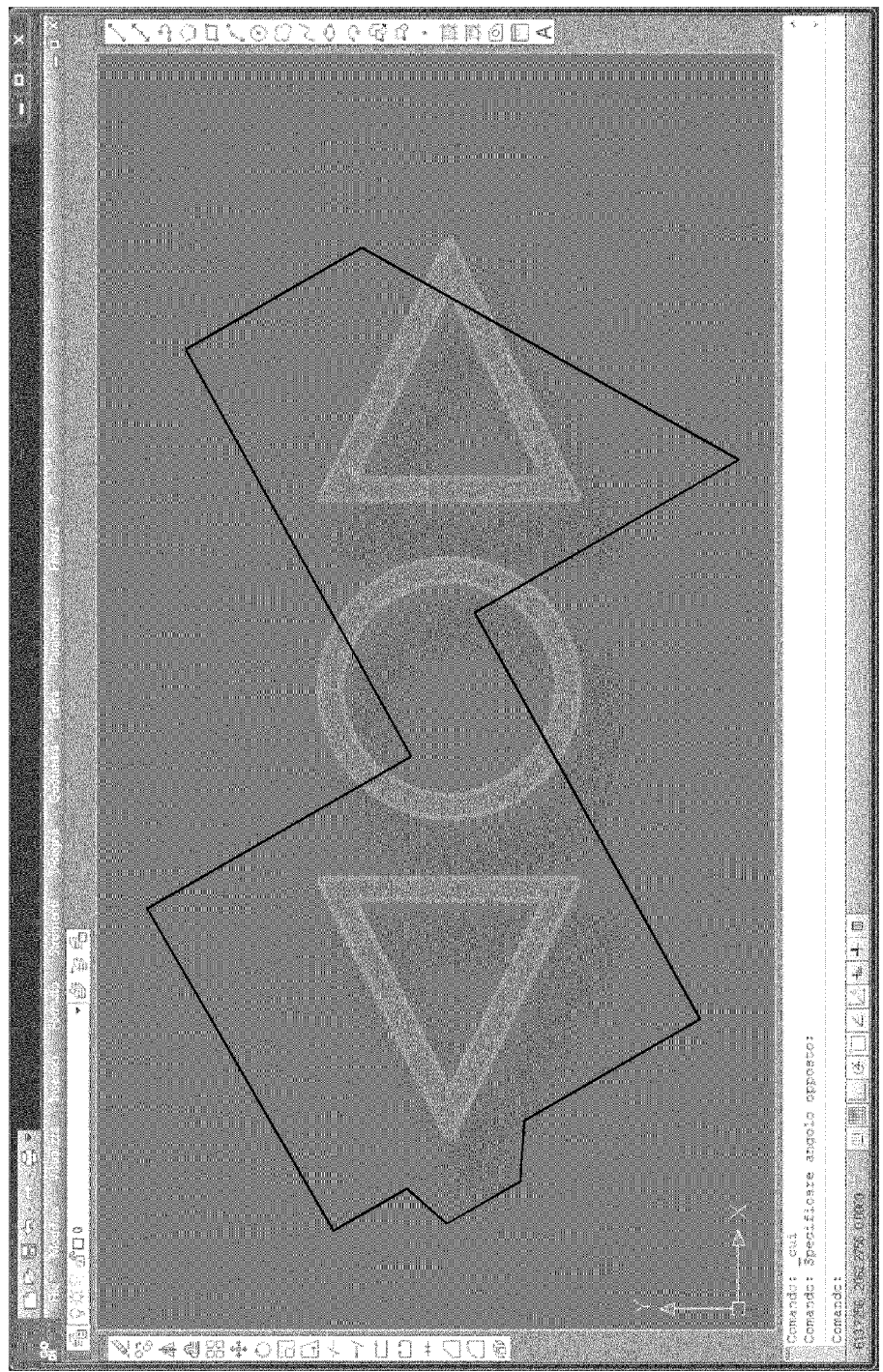

Once both plans have been obtained, the point 81 is caused to coincide with the point 91 and the point 89 is caused to coincide with the point 95, the two plans of the rooms are joined to obtain the plan of the entire apartment, see FIG. 6g.

It shall be noted that the method steps as described above may be carried out either by directly controlling the device, or by using the control unit of the remote unit, as described above.

Furthermore, the device may be programmed for the surveying steps to be carried out automatically, e.g. by setting a 360° surveying process, with predetermined distance sensing intervals, or by carrying out the surveying process over a given range of rotation angles, which is particularly useful for curved surfaces.

While the above described method steps are carried out by the device, it will be understood from this description that a logic program may be provided for controlling the device to carry out the above described steps.

This logic program may be provided or loaded into the device, or into the remote unit with which the device communicates.

In addition to the above described characteristics, the logic program can also provide the identification of common points of the two plans of FIG. 6c and FIG. 6f, thereby automatically recreating the plan of FIG. 6g, i.e. automatically rotating at least one of the two plans.

Obviously, all the above described tasks may be also accomplished manually.

The invention claimed is:

1. A device for surveying interior spaces and architectural features, which is adapted to be placed in an environment for laying out a plan of said environment, the device comprising:

an instrument for sensing a distance (11, 12) of a predetermined point relative to a position of said device;

a system that senses a rotation of said device;

an electronic control unit (13) operatively coupled to a processing unit, wherein the electronic control unit is configured to sense a distance of a first predetermined point relative to a position of the device, rotate the device, sense the distance of a second predetermined point and measure rotation, and cause the processing unit to assign position coordinates to the first and the second predetermined points, to plot a first line as a segment connecting the first and the second predetermined points, and sense additional points, assign position coordinates thereto, and plot segments therebetween; and a power supply and generation source that powers said device, wherein the processing unit is further configured to process sensed data and reconstruct a plan of said environment by having a computer assisted design (CAD) program accessed by the processing unit define a shape of said environment by defining angles between plotted segments.

2. The device as claimed in claim 1, further comprising a communication unit that communicates sensed data to at least one remote unit, the at least one remote unit having a processor that executes a logic program and at least one processing unit that processes the data that have been sensed by said device.

3. The device as claimed in claim 1, wherein said device is composed of two external cases that include an upper external case (1) located above a lower external case (2), said upper case (1) being rotatably connected to said lower case (2), such that said upper case (1) rotates about a vertical axis relative to said lower case (2).

4. The device as claimed in claim 3, wherein said upper case (1) comprises said distance sensing instrument (11, 12), said rotation sensing system and said electronic control unit (13), and wherein said lower case (2) comprises said power supply and generation source (21).

5. The device as claimed in claim 3, further comprising electric connection circuits (3) that connect said lower case (2) to said upper case (1).

6. The device as claimed in claim 4, further comprising an electric motor (15) adapted to move said upper case (1) relative to said lower case (2), the electric motor (15) being located in said upper case (1), and said motor (15) having a shaft (151) extending into said lower case (2) and being rigidly joined thereto.

7. The device as claimed claim 4, wherein said lower case (2) and said upper case (1) have a shape of a parallelepiped, with said upper case (1) having base surfaces congruent with base surfaces of said lower case (2).

8. The device as claimed in claim 7, wherein a base of said parallelepipeds has sides ranging from 3 to 10 cm, and said parallelepipeds have a height ranging from 0.5 to 3 cm.

9. A device for surveying interior spaces and architectural features, which is adapted to be placed in environments for laying out a plan of said environments, comprising:
- an instrument for sensing a distance (11, 12) of a predetermined point relative to a position of said device;
- a system that senses a rotation of said device;
- an electronic control unit (13);
- a power supply and generation source that powers said device, wherein said device is composed of two external cases that include an upper external case (1) located above a lower external case (2), said upper case (1) being rotatably connected to said lower case (2), such that said upper case (1) rotates about a vertical axis relative to said lower case (2); and
- electric connection circuits (3) that connect said lower case (2) to said upper case (1),
- wherein said connection circuits (3) are composed of at least one upper annular track (31), rigidly joined to said upper case (1), and connected to a corresponding lower annular track (32), rigidly joined to said lower case (2), wherein at least one connecting ball (33) interposed between said upper and lower annular tracks, such that said upper case (1) rotates relative to said lower case (2) when said connecting ball is rotated,
- said annular tracks being both coaxial with a vertical center axis of said device.

10. The device as claimed in claim 6, wherein the system that senses the rotation of said device consist of an accelerometer incorporated in the electric motor (15).

11. The device as claimed in claim 2, wherein said remote unit comprises at least one control unit configured to control operation of said device.

12. The device as claimed in claim 1, further comprising a photographic acquisition device is provided configured to capture images of a surrounding environment.

13. The device as claimed in claim 12, further comprising a second control unit adapted to control said photographic acquisition device and control operation thereof.

14. A method of laying out and reconstructing interior plans using a surveying device located inside a first environment, the surveying device having a processing unit coupled thereto, the method comprising the following steps:
a) placing the surveying device in a first predetermined zone in said first environment,
b) sensing a distance of a first predetermined point relative to a position of said device;
c) rotating the device and sensing a distance of a second predetermined point and measuring rotation, said device comprising a system that senses the rotation thereof, and causing the processing unit to assign position coordinates to the first and the second predetermined points and to plot a first line as a segment connecting the first and the second predetermined points;
d) repeating steps b) and c); and
e) processing sensed data and reconstructing a plan of said first environment by having a computer assisted design (CAD) program accessed by the processing unit define a shape of the first environment by defining angles between segments plotted in step c).

15. The method as claimed in claim 14, further comprising the additional steps of:
f) placing the device in a second environment;
g) sensing a distance of a third predetermined point relative to the position of said device;
h) rotating the device and sensing the distance of a fourth predetermined point and measuring the rotation of the device, and causing the processing unit to assign position coordinates to the third and the fourth predetermined points and to plot a second line as a segment connecting the third and the fourth predetermined points;
i) repeating steps g) and h), with two points sensed during steps g) and h) coinciding with two corresponding points sensed during the steps b) and c); and
j) processing the sensed data and reconstructing the plan of said second environment by having the CAD program accessed by the processing unit define a shape of the second environment by defining angles between segments plotted in step h), and further reconstructing the plan of the first and the second environments joined together by causing the CAD to join the first and the second environments at the two points sensed during the steps g) and h) which coincide with the two corresponding points sensed during the steps b) and c).

16. The method as claimed in claim 15, wherein steps e) and l) are carried out by a remote unit, said device having a communication unit that communicates with said remote unit.

17. The method as claimed in claim 16, wherein steps b), c), g) and h) are carried out remotely through a control unit located in said remote unit.

18. The method as claimed in claim 16, wherein the steps b), c), g) and h) are carried out automatically.

19. The method as claimed in one or more of claim 15, further comprising a step m) of acquiring at least one image of a surrounding environment.

20. The method as claimed in claim 19, wherein step m) is carried out automatically.

* * * * *